WILLIAM A. N. LONG.
Improvement in Milling Machines.
No. 118,732. Patented Sep. 5. 1871.

Witnesses
S. N. Piper
L. N. Möller

William A. N. Long,
by his attorney
R. H. Eddy

118,732

UNITED STATES PATENT OFFICE.

WILLIAM A. N. LONG, OF WORCESTER, MASSACHUSETTS, ASSIGNOR TO HIMSELF AND GEORGE H. COATES, OF SAME PLACE.

IMPROVEMENT IN MILLING-MACHINES.

Specification forming part of Letters Patent No. 118,732, dated September 5, 1871.

*To all whom it may concern:*

Be it known that I, WILLIAM A. N. LONG, of the city and county of Worcester, of the State of Massachusetts, have invented a new and useful Turning and Milling-Machine; and do hereby declare the same to be fully described in the following specification and represented in the accompanying drawing, of which—

Figure 1:
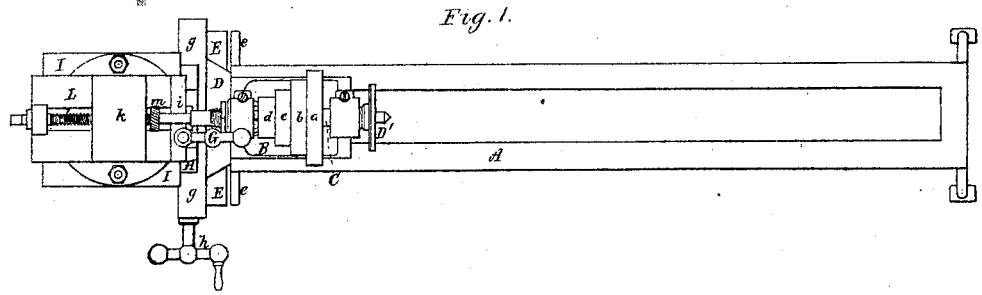
Figures 2, 4:
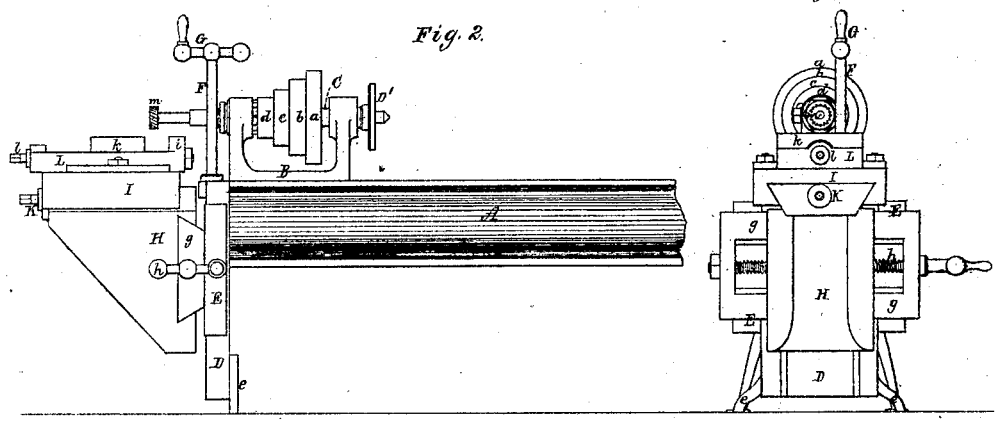
Figure 3:
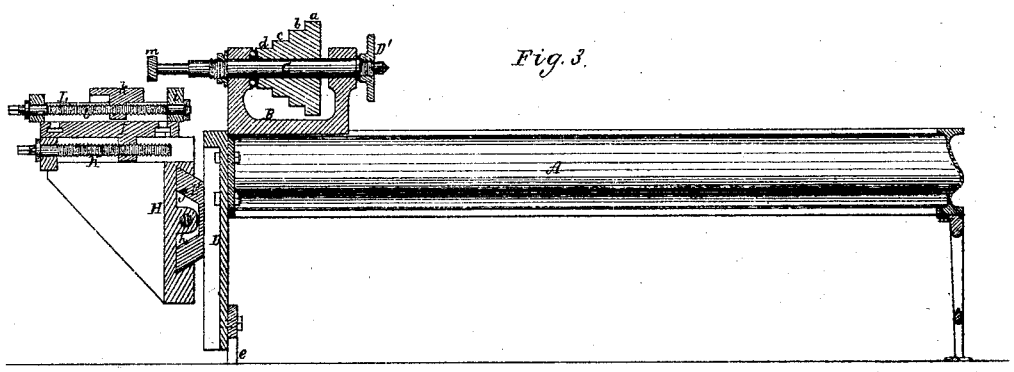

Figure 1 is a top view, Fig. 2 a front elevation, Fig. 3 a longitudinal section, and Fig. 4 an end view of it.

In carrying out my invention I apply to the arbor of a turning-lathe a milling-wheel, and to the end of the lathe-bed frame, and under such milling-wheel, mechanism or devices, as hereinafter described for supporting and moving an article under the action of the milling-wheel. I thus have what may be termed a combined lathe and milling-machine, in which the arbor of the lathe is that of the milling-wheel, thereby saving an auxiliary arbor and mechanism for operating it, and also saving or rendering unnecessary an auxiliary frame for the support of the milling mechanism. Other advantages also result from my combination and arrangement of parts, such, for instance, as a saving of friction and a consequent diminution of power required to operate the lathe and milling-machine. My combination, particularly when the lathe is provided with a turning-tool or cutter duly supported, enables one attendant to tend both machines.

In the drawing, A denotes the lathe-bed frame, B the puppet-head, and C the arbor, the latter being provided with a chuck, D', and a set of driving-pulleys, $a\ b\ c\ d$. The lathe is to be supposed to be constructed like or to have all the characteristics of a common turning-lathe, though some of the appliances thereof are omitted in the drawing. Against one end of the bed-frame A there is fixed a dovetailed standard, D, provided, when necessary, with legs $e\ e$, such standard with its legs serving as one of the supports of the said frame A, and also to receive a carriage, E, adapted to such standard D, so as to slide vertically thereon, a screw, F, provided with a crank, G, serving to effect the elevation or depression of such carriage on the standard. The said carriage is provided with a dovetailed tongue, $g$, arranged horizontally, as shown. Upon the said tongue another carriage, H, fits, so as to slide horizontally and transversely of the lathe-bed, its movements in either direction being effected by a cranked screw, $h$. On the carriage H is another carriage, I, arranged to slide horizontally in directions at right angles with the path of movement of the carriage H and having an operating-screw, K. On the top of the carriage I is another carriage, L, it being so applied to the carriage I as to be capable of being revolved circularly therein. From this latter carriage a jaw or abutment, $i$, projects upward and operates with a movable jaw, $k$, provided with an actuating-screw, $l$, all being as shown, the two jaws being to hold the article to be milled. There is fixed on the outer end of the lathe-arbor a milling-wheel, $m$. The said wheel and the parts described as projecting from the adjacent end of the lathe-bed frame constitute well-known portions of a common milling-machine, or those designed to hold or support an article to be reduced and to move it, as may be required, to and under the milling-wheel. The said milling-wheel revolves and is rotated by the lathe-arbor, the article to be milled by it being supported by and between the jaws and moved up to the milling-wheel and underneath it, as occasion may require.

I claim—

The combination and arrangement of the lathe-arbor C, the puppet-head B, and the bed-frame A with a milling-wheel, $m$, and machinery for supporting an article to be milled and moving to and under the said wheel, as may be required, such machinery, as explained, consisting of the jawed carriage L, the carriages I, H, and E, and the supporting-standard D, arranged, applied together, and provided with operative screws, essentially as set forth.

WM. A. N. LONG.

Witnesses:
R. H. EDDY,
S. N. PIPER.